(12) United States Patent
Sano et al.

(10) Patent No.: US 8,856,035 B2
(45) Date of Patent: Oct. 7, 2014

(54) STORE SYSTEM AND SALES REGISTRATION METHOD

(75) Inventors: Masahito Sano, Shizuoka (JP); Hiroyuki Ueda, Shizuoka (JP); Nobuo Watanabe, Shizuoka (JP); Hiroyuki Koyama, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 222 days.

(21) Appl. No.: 13/214,395

(22) Filed: Aug. 22, 2011

(65) Prior Publication Data

US 2012/0047039 A1 Feb. 23, 2012

(30) Foreign Application Priority Data

Aug. 23, 2010 (JP) ................................. 2010-186586
Jul. 1, 2011 (JP) ................................. 2011-147636

(51) Int. Cl.
*G06Q 20/00* (2012.01)
*G07G 3/00* (2006.01)
*G06Q 20/20* (2012.01)
*G07G 1/00* (2006.01)
*G07G 1/01* (2006.01)

(52) U.S. Cl.
CPC ............... *G07G 3/003* (2013.01); *G06Q 20/20* (2013.01); *G06Q 20/208* (2013.01); *G07G 1/0063* (2013.01); *G07G 1/01* (2013.01)
USPC .......................................................... 705/23

(58) Field of Classification Search
CPC .............................. G06Q 20/208; G06Q 20/20
USPC .......................................................... 705/23
See application file for complete search history.

(56) References Cited

U.S. PATENT DOCUMENTS

| | | | |
|---|---|---|---|
| 5,297,222 A * | 3/1994 | Mori et al. | 382/318 |
| 5,543,607 A * | 8/1996 | Watanabe et al. | 235/383 |
| 5,546,475 A | 8/1996 | Bolle et al. | |
| 6,738,723 B2 * | 5/2004 | Hamilton | 702/128 |
| 6,932,272 B1 * | 8/2005 | Liu et al. | 235/462.01 |

(Continued)

FOREIGN PATENT DOCUMENTS

| | | |
|---|---|---|
| CN | 1123940 | 6/1996 |
| JP | 06-223271 | 8/1994 |

(Continued)

OTHER PUBLICATIONS

English Translation of Final Office Action of Notice of Rejection for Japanese Patent Application No. 2011-147636 Dated Apr. 30, 2013, 5 pgs.

(Continued)

*Primary Examiner* — Seye Iwarere
(74) *Attorney, Agent, or Firm* — Amin, Turocy & Watson, LLP

(57) ABSTRACT

According to one embodiment, a store system includes: an image output section configured to output an image picked up by an image pickup section; an object recognizing section configured to recognize a specific object by reading a feature value of the output image; a check-image display section configured to display, on a display section, at least an image concerning the recognized object; and a problem solving section configured to receive, when there is a problem in the recognition of the object, an instruction indicating the problem and solve the problem according to content of the received instruction.

11 Claims, 13 Drawing Sheets

(56) References Cited

U.S. PATENT DOCUMENTS

| | | | |
|---|---|---|---|
| 7,620,568 B1* | 11/2009 | Parker-Malchak | 705/23 |
| 2002/0123932 A1* | 9/2002 | Brenhouse | 705/16 |
| 2002/0138374 A1* | 9/2002 | Jennings et al. | 705/29 |
| 2002/0186133 A1* | 12/2002 | Loof | 340/572.1 |
| 2004/0214643 A1* | 10/2004 | Parrott et al. | 463/43 |
| 2005/0116945 A1* | 6/2005 | Mochizuki et al. | 345/418 |
| 2006/0011726 A1* | 1/2006 | Chen et al. | 235/462.01 |
| 2008/0049029 A1* | 2/2008 | Kurata et al. | 345/519 |
| 2008/0052194 A1* | 2/2008 | Shinohara et al. | 705/27 |
| 2008/0300854 A1* | 12/2008 | Eibye | 704/3 |
| 2009/0039164 A1* | 2/2009 | Herwig et al. | 235/462.41 |
| 2009/0059270 A1* | 3/2009 | Opalach et al. | 358/1.15 |
| 2009/0060349 A1* | 3/2009 | Linaker et al. | 382/209 |
| 2009/0237546 A1* | 9/2009 | Bloebaum et al. | 348/333.01 |
| 2009/0285443 A1* | 11/2009 | Camp et al. | 382/100 |
| 2009/0320076 A1* | 12/2009 | Chang | 725/60 |
| 2010/0021063 A1* | 1/2010 | Yang | 382/190 |
| 2010/0151901 A1* | 6/2010 | Roden et al. | 455/556.1 |
| 2011/0075939 A1* | 3/2011 | Chiou et al. | 382/224 |
| 2011/0198400 A1 | 8/2011 | Sano | |
| 2011/0215147 A1* | 9/2011 | Goncalves | 235/383 |
| 2012/0043375 A1 | 2/2012 | Ueda et al. | |
| 2012/0047037 A1 | 2/2012 | Ueda et al. | |
| 2012/0047038 A1 | 2/2012 | Sano et al. | |
| 2012/0047040 A1 | 2/2012 | Ueda et al. | |

FOREIGN PATENT DOCUMENTS

| | | |
|---|---|---|
| JP | 07-302343 | 11/1995 |
| JP | 08-292013 | 11/1996 |
| JP | 2004-127013 | 4/2004 |
| JP | 2005-078158 | 3/2005 |
| JP | 2005-338972 | 12/2005 |
| JP | 2008-027427 | 2/2008 |
| JP | 2009-237660 | 10/2009 |
| JP | 2009-245165 | 10/2009 |
| JP | 2010-518507 | 5/2010 |
| WO | 2008-100248 | 8/2008 |

OTHER PUBLICATIONS

Japanese Office Action for Japanese Application No. 2011-147636 mailed on Aug. 7, 2012.

Office Action for Chinese Patent Application No. 201110241317.0 Dated Jun. 13, 2013, 5 pgs.

Office Action for Chinese Patent Application No. 201110241317.0 mailed Dec. 6, 2013.

Japanese Office Action for Japanese Patent Application No. 2013-158325 mailed on May 13, 2014.

Japanese Office Action for Japanese Patent Application No. 2013-158326 mailed on May 13, 2014.

* cited by examiner

| COMMODITY ID | COMMODITY CLASSIFICATION | COMMODITY NAME | UNIT PRICE | COMMODITY IMAGE | THRESHOLD |
|---|---|---|---|---|---|
| XXXXXXXX | DOUGHNUT | PLAIN DOUGHNUT | 200 YEN | ◎ | 0.50 |
| ⋮ | ⋮ | ⋮ | ⋮ | ⋮ | ⋮ |

F1

STORE SYSTEM AND SALES REGISTRATION METHOD

CROSS-REFERENCE TO RELATED APPLICATIONS

This application is based upon and claims the benefit of priority from the prior Japanese Patent Applications No. 2010-186586, filed on Aug. 23, 2010 and No. 2011-147636, filed on Jul. 1, 2011; the entire contents of all of which are incorporated herein by reference.

FIELD

Embodiments described herein relate generally to a store system and a sales registration method.

BACKGROUND

In the past, in a supermarket or the like, a commodity code reading apparatus is used that picks up an image of a code symbol such as a barcode or a two-dimensional code (e.g., a QR code (registered trademark)) affixed to a commodity using a digital camera such as a CCD image sensor and detects and decodes the code symbol detected from the picked-up image to read a commodity code.

However, in the related art, the code symbol such as the barcode or the two-dimensional code has to be affixed to the commodity. Therefore, concerning perishable foods, buns, and the like, packages or the like are separately prepared and code symbols are affixed to the packages or a code symbol table is prepared.

DETAILED DESCRIPTION

In general, according to one embodiment, a store system includes: an image output section configured to output an image picked up by an image pickup section; an object recognizing section configured to recognize a specific object by reading a feature value of the output image; a check-image display section configured to display, on a display section, at least an image concerning the recognized object; and a problem solving section configured to receive, when there is a problem in the recognition of the object, an instruction indicating the problem and solve the problem according to content of the received instruction.

A store system and a sales registration method according to this embodiment are explained below with reference to the accompanying drawings using a checkout system as an example. The store system is a checkout system (a POS system) or the like including a POS terminal configured to perform registration and settlement of commodities purchased in one transaction. This embodiment is an example of application to a checkout system installed in a store such as a supermarket, a pastry shop, or a doughnut shop.

Figure 1:
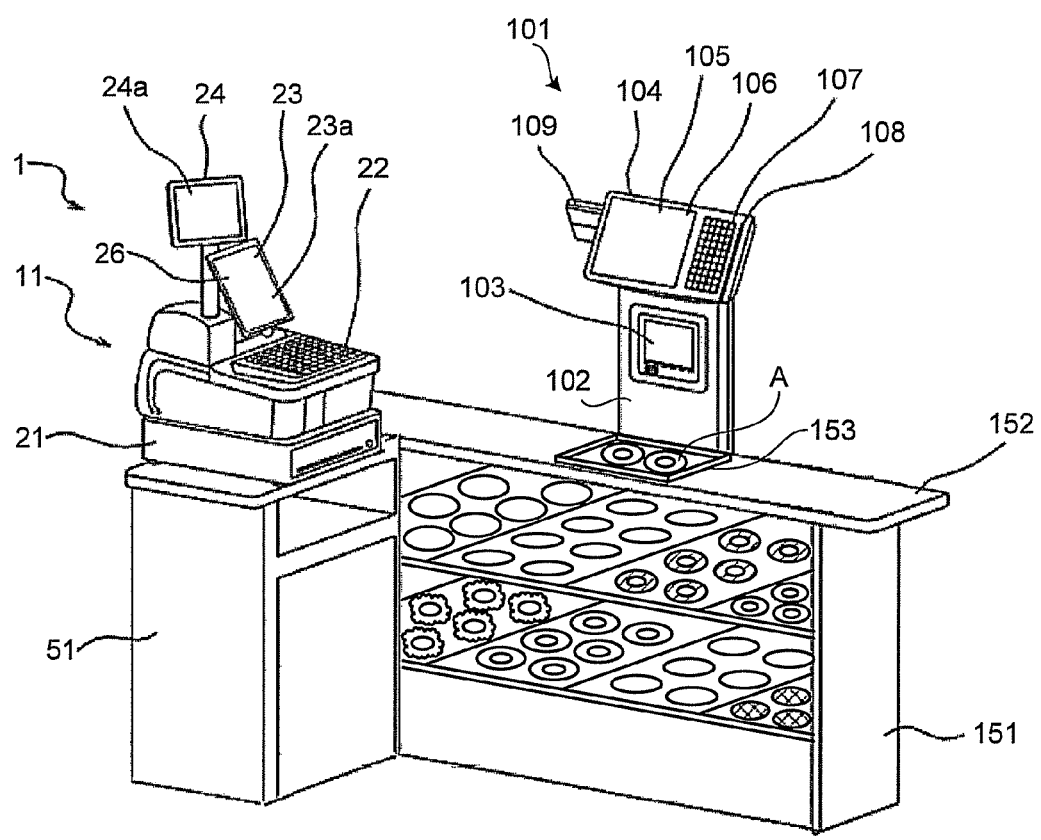
FIG. 1 is a perspective view of a checkout system according to an embodiment.

FIG. 1 is a perspective view of a checkout system 1. As shown in FIG. 1, the checkout system 1 includes a POS terminal configured to perform registration and settlement of commodities purchased in one transaction. The POS terminal 11 is placed on the upper surface of a drawer 21 on a checkout table 51. The drawer 21 is controlled to be opened by the POS terminal 11. A keyboard 22 including various keys, which is an input section, pressed by an operator (a store clerk) is arranged on the upper surface of the POS terminal 11. A display device 23 configured to display information to the operator is provided further behind the keyboard 22 viewed from the operator who operates the keyboard 22. The display device 23 displays information on a display surface 23a thereof. A touch panel 26, which is an input section, is laminated on the display surface 23a. A customer display device 24 is vertically provided to freely rotate further behind the display device 23. The customer display device 24 displays information on a display surface 24a thereof. In the customer display device 24 shown in FIG. 1, the display surface 24a is faced to the front side in FIG. 1. However, the customer display device 24 is rotated such that the display surface 24a faces the back side in FIG. 1, whereby the customer display device 24 displays information to a customer.

A showcase 151 is arranged to form an L shape with the checkout table 51 on which the POS terminal 11 is placed. A loading surface 152 is formed on the upper surface of the showcase 151. A paper box 153 that stores commodities A is placed on the loading surface 152. The paper box 153 may be a tray or the like used in a store such as a pastry shop or a bakery.

A commodity reading apparatus 101 connected to the POS terminal 11 to freely transmit and receive data to and from the POS terminal 11 is set on the loading surface 152 of the showcase 151. The commodity reading apparatus 101 includes a housing 102 having a thin rectangular shape. A reading window 103 is arranged on the front surface of the housing 102. A display and operation section 104 is attached to an upper part of the housing 102. A display device 106, on the surface of which a touch panel 105 is laminated, is provided in the display and operation section 104. A keyboard 107 is disposed on the right of the display device 106. A card reading groove 108 of a not-shown card reader is provided on the right of the keyboard 107. A customer display device 109 for providing the customer with information is set on the left back side of the rear surface of the display and operation section 104 viewed from the operator.

Figure 2:
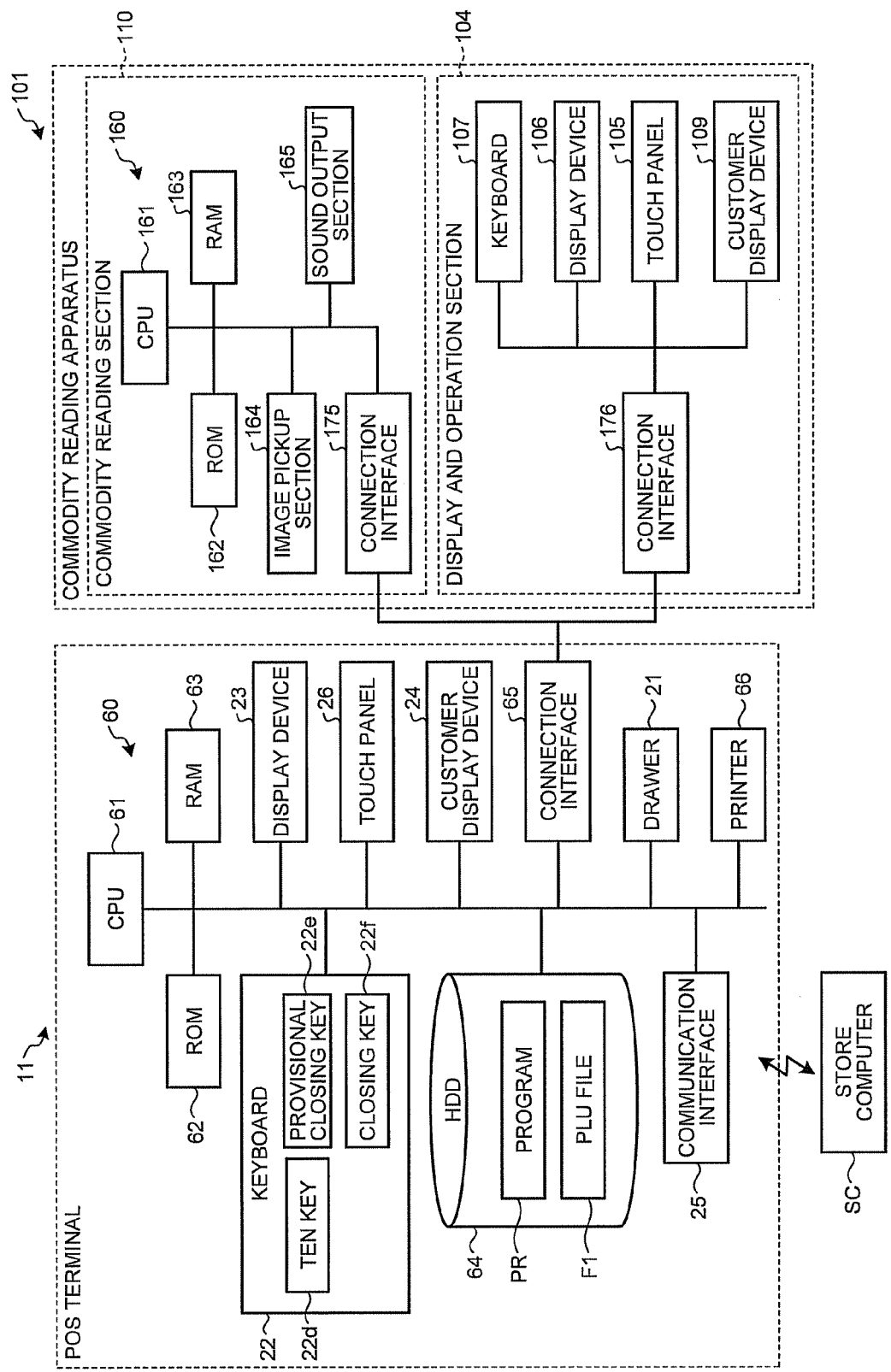
FIG. 2 is a block diagram of hardware configurations of a POS terminal and a commodity reading apparatus.

Such a commodity reading apparatus 101 includes a commodity reading section 110 (see FIG. 2). In the commodity reading section 110, an image pickup section 164 (see FIG. 2) is arranged behind the reading window 103.

In a pastry shop, a doughnut shop or the like, a customer selects the commodity A in the showcase 151 and a store clerk puts the commodity A on a tray (not shown) or the like. Thereafter, the commodity A is moved from the tray to the paper box 153 by the store clerk. After all commodities are moved to the paper box 153, the paper box 153 is faced to the reading window 103 of the commodity reading apparatus 101. At this point, the image pickup section 164 (see FIG. 2) arranged behind the reading window 103 picks up an image of all the commodities A in the paper box 153. The commodity reading apparatus 101 detects all or a part of the commodities A included in the image picked up by the image pickup section 164. If the commodity reading apparatus 101 detects that all or a part of the commodities A is included in the image picked up by the image pickup section 164, the commodity reading apparatus 101 outputs the picked-up image to the POS terminal 11. The POS terminal 11 recognizes, concerning each of the commodities A, referring to a PLU file F1 (details are explained later; see FIG. 3) in which information related to sales registration of the commodities A and images of the commodities A are associated, the commodity A as a specific object from the image of all or a part of the commodities A picked up by the image pickup section 164 of the commodity reading section 110 to specify the commodity A to be subjected to sales registration. The POS terminal 11 records information related to the sales registration such as a commodity ID, a commodity classification, a commodity name, and a unit price of the specified commodity A in a sales master file (not shown) and performs the sales registration.

FIG. 2 is a block diagram of hardware configurations of the POS terminal 11 and the commodity reading apparatus 101. The POS terminal 11 includes a microcomputer 60 functioning as an information processing section configured to execute information processing. The microcomputer 60 is configured by connecting, via a bus, a ROM (Read Only Memory) 62 and a RAM (Random Access Memory) 63 to a CPU (Central Processing Unit) 61 configured to execute various kinds of arithmetic processing and control the sections.

All of the drawer 21, the keyboard 22, the display device 23, the touch panel 26, and the customer display device 24 are connected to the CPU 61 of the POS terminal 11 via various input and output circuits (all of which are not shown). These sections are controlled by the CPU 61.

The keyboard 22 includes a ten key 22d, on the upper surface of which numbers such as "1", "2" and "3" and a multiplication operator "x" are displayed, a provisional closing key 22e and a closing key 22f.

A HDD (Hard Disk Drive) 64 is connected to the CPU 61 of the POS terminal 11. A computer program and various files are stored in the HDD 64. All or a part of the computer program and the various files stored in the HDD 64 are copied to the RAM 63 and sequentially executed by the CPU 61 during the start of the POS terminal 11. An example of the computer program stored in the HDD 64 is a computer program PR for commodity sales data processing. An example of the files stored in the HDD 64 is the PLU file F1 distributed from a store computer SC and stored.

Figures 3, 4:
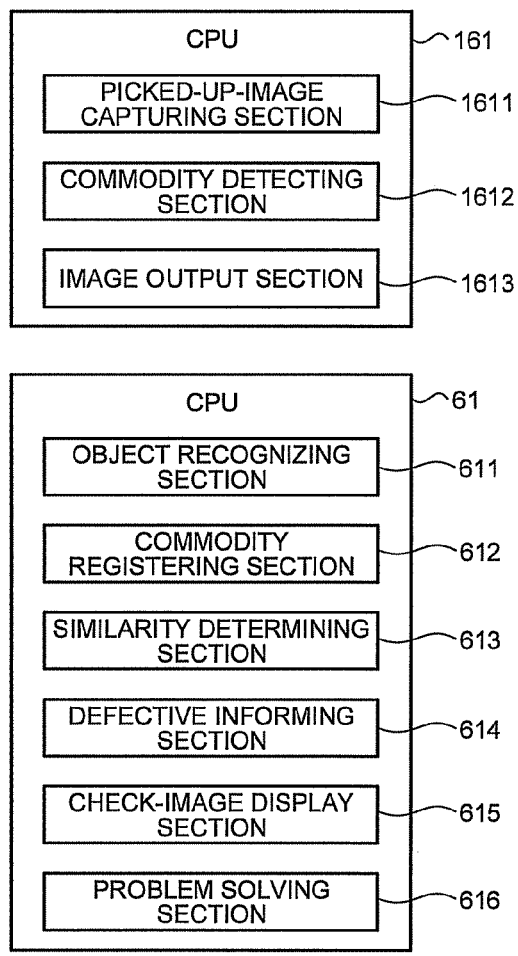
FIG. 3 is a conceptual diagram of a data structure of a PLU file.
FIG. 4 is a block diagram of a functional configuration of a CPU.

The PLU file F1 is a file in which, concerning each of the commodities A displayed and sold in the store, association of information related to sales registration of the commodity A and an image of the commodity A is set. FIG. 3 is a conceptual diagram of a data structure of the PLU file F1. As shown in FIG. 3, the PLU file F1 is a file that stores, for each of the commodities A, information concerning the commodity A such as a commodity ID uniquely allocated to the commodity A, a commodity classification to which the commodity A belongs, a commodity name, and a unit price, a commodity image of the commodity A, and a threshold "similarity: 0.XX". As explained in detail later, for example, if the commodity A is a doughnut or the like and the doughnut is insufficiently or excessively fried, it is possible to determine that the commodity A is a commodity different from a regular state by comparing the threshold "similarity: 0.XX" with a commodity image of the commodity A stored in the PLU file F1 in advance.

Referring back to FIG. 2, a communication interface 25 for executing data communication with the store computer SC is connected to the CPU 61 of the POS terminal 11 via an input and output circuit (not shown). The store computer SC is set in a backyard or the like of the store. The PLU file F1 to be distributed to the POS terminal 11 is stored in a HDD (not shown) of the store computer SC.

A connection interface 65 enabling data transmission and reception between the POS terminal 11 and the commodity reading apparatus 101 is connected to the CPU 61 of the POS terminal 11. The commodity reading apparatus 101 is connected to the connection interface 65. A printer 66 configured to perform printing on a receipt or the like is connected to the CPU 61 of the POS terminal 11. The POS terminal 11 prints transaction contents of one transaction on the receipt under the control by the CPU 61.

The commodity reading apparatus 101 includes a microcomputer 160. The microcomputer 160 is configured by connecting a ROM 162 and a RAM 163 to a CPU 161 via a bus. A computer program to be executed by the CPU 161 is stored in the ROM 162. An image pickup section 164 and a sound output section 165 are connected to the CPU 161 via various input and output circuits (all of which are not shown). The operation of the image pickup section 164 and the sound output section 165 is controlled by the CPU 161. The display and operation section 104 is connected to the POS terminal 11 via a connection interface 176. The operation of the display and operation section 104 is controlled by the CPU 61 of the POS terminal 11.

The image pickup section 164 is a color CCD image sensor, a color CMOS image sensor or the like and is image pickup means for performing image pickup from the reading window 103 under the control by the CPU 161. For example, the image pickup section 164 performs image pickup of a 30 fps moving image. Frame images sequentially picked up by the image pickup section 164 at a predetermined frame rate are stored in the RAM 163.

The sound output section 165 is a sound circuit, a speaker and the like for generating a warning sound or the like set in advance. The sound output section 165 performs alerting by sound such as the warning sound under the control by the CPU 161.

Further, a connection interface 175 connected to the connection interface 65 of the POS terminal 11 and enabling data transmission and reception between the commodity reading apparatus 101 and the POS terminal 11 is connected to the CPU 161. An image (an image including all or a part of the commodity A) picked up by the image pickup section 164 of the image reading apparatus 101 is output via the connection interface 175 and input to the POS terminal 11 via the connection interface 65 under the control by the CPU 161.

Functional sections of the CPU 161 and the CPU 61 realized by the CPU 161 and the CPU 61 sequentially executing computer programs are explained with reference to FIG. 4. FIG. 4 is a block diagram of functional configurations of the CPU 161 and the CPU 61. As shown in FIG. 4, the CPU 161 sequentially executes the computer programs to thereby include functions of a picked-up-image capturing section 1611, a commodity detecting section 1612, and an image output section 1613, which is image output means. Similarly, the CPU 61 includes functions of an object recognizing section 611, which is object recognizing means, a commodity registering section 612, a similarity determining section 613, a defective informing section 614, a check-image display section 615, which is check-image displaying means, and a problem solving section 616, which is problem solving means.

The picked-up-image capturing section 1611 output an image pickup ON signal to the image pickup section 164 and causes the image pickup section 164 to start an image pickup operation. The picked-up-image capturing section 1611 sequentially captures frame images picked up by the image pickup section 164 and stored in the RAM 163 after the start of an image pickup operation. The capturing of the frame images by the picked-up-image capturing section 1611 is performed in order of storage in the RAM 163.

The commodity detecting section 1612 detects, using a pattern matching technique or the like, all or a part of the commodity A included in a frame image captured by the picked-up-image capturing section 1611. Specifically, the commodity detecting section 1612 extracts a contour line or the like from an image obtained by binarizing the captured frame image. Subsequently, the commodity detecting section 1612 compares a contour line extracted from the latest frame image and a contour line extracted from the present frame image and detects a changed portion, i.e., reflection of a commodity faced to the reading window 103 for sales registration. As another method of detecting a commodity, the commodity detecting section 1612 detects presence or absence of a skin color area from the captured frame image. Subsequently, if a skin color area is detected, i.e., if reflection of a hand of the store clerk is detected, the commodity detecting section 1612 performs the detection of a contour line to attempt to extract a contour of a commodity assumed to be gripped by the hand of the store clerk. At this point, if a contour indicating the shape of the hand and other contours are detected, since the hand of the store clerk grips the commodity, the commodity detecting section 1612 detects reflection of the commodity.

The image output section 1613 outputs the frame image captured by the picked-up-image capturing section 1611 to the POS terminal 11 via the connection interface 175. The image output section 1613 may output frame images captured by the picked-up-image capturing section 1611 to the POS terminal 11 one after another. However, in this embodiment, it is assumed that the image output section 1613 outputs a frame image in which all or a part of the commodity A is detected by the commodity detecting section 1612 to the POS terminal 11. Since the frame image in which all or a part of the commodity A is detected by the commodity detecting section 1612 is output to the POS terminal 11 in this way, it is possible to prevent the POS terminal 11 from performing object recognition executed by referring to the PLU file F1 using a frame image not including all or a part of the commodity A.

Since recognition processing for a specific object requires processing time, it is possible to reduce the processing time by preventing processing on a frame image not including all or a part of the commodity A in which recognition of a specific object is not expected.

The object recognizing section 611 recognizes, referring to commodity images of the PLU file F1, the commodity A as a specific object by reading a state of a tint and a state of the surface of the commodity A such as an unevenness state of the surface as feature values from an image of all or a part of the commodity A picked up by the image pickup section 164 of the commodity reading apparatus 101. To realize a reduction in the processing time, the object recognizing section 611 does not take into account the contour and the size of the commodity A. The POS terminal 11 can specify, according to a recognition result of the object recognizing section 611, a commodity read by the commodity reading apparatus 101 out of commodities registered in the PLU file F1 in advance.

The similarity determining section 613 calculates similarity concerning the commodity A recognized by the object recognizing section 611 and determines whether the similarity exceeds a threshold set in advance in the PLU file F1.

Recognizing an object included in an image in this way is called generic object recognition. Concerning such generic object recognition, various recognition techniques are explained in a document described below.

Keiji Yanai, "The Present Situation and The Future of Generic Object Recognition", The Institute of Electronics, Information and Communication Engineers Transaction, Vol. 48, No. SIG 16 [retrieved on Aug. 10, 2010], Internet <URL: http://mm.cs.uec.ac.jp/IPSJ-TCVIM-Yanai pdf>

A technique for performing the generic object recognition by dividing an area of an image for each object is explained in a document described below.

Jamie Shotton, et al., "Semantic Texton Forests for Image Categorization and Segmentation", [retrieved on Aug. 10, 2010], Internet <URL: http://citeseerx.ist.psu.edu/viewdoc/download?doi=10.1.1.1 45.3036&rep=repl&type=dpf>

The commodity registering section 612 records, in a sales master file or the like, information concerning sales registration related to a commodity image recognized by the object recognizing section 611, i.e., a commodity ID, a commodity classification, a commodity name, a unit price and the like of a commodity specified as the commodity read by the commodity reading apparatus 101 and performs the sales registration.

Figure 5:
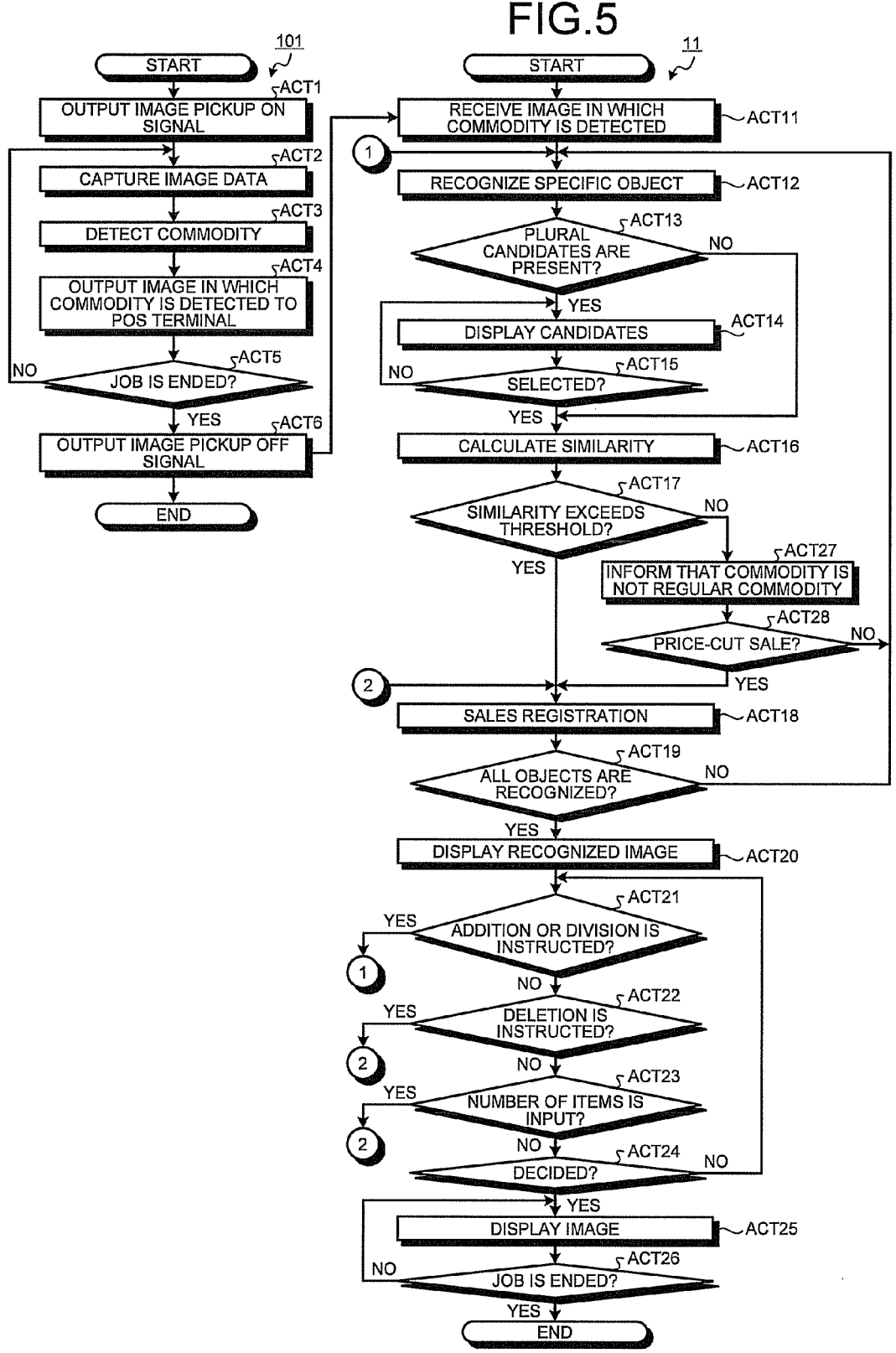
FIG. 5 is a flowchart for explaining an example of processing operations of the checkout system.

The operations of the checkout system 1 are explained in detail. FIG. 5 is a flowchart for explaining an example of the operations of the checkout system 1 according to this embodiment.

First, the operations on the commodity reading apparatus 101 side are explained. As shown in FIG. 5, when processing is started according to, for example, the start of commodity registration by the POS terminal 11, the picked-up-image capturing section 1611 outputs an image pickup ON signal to the image pickup section 164 and starts image pickup by the image pickup section 164 (Act 1). Subsequently, the picked-up-image capturing section 1611 captures a frame image (a picked-up image) picked up by the image pickup section 164 and stored in the RAM 163 (Act 2). Subsequently, the commodity detecting section 1612 detects all or a part of all the commodities A in the paper box 153 from the frame image captured by the picked-up-image capturing section 1611 (Act 3). The image output section 1613 outputs the frame image in which all or a part of all the commodities A in the paper box 153 are detected by the commodity detecting section 1612 to the POS terminal 11 (Act 4).

Figure 6:
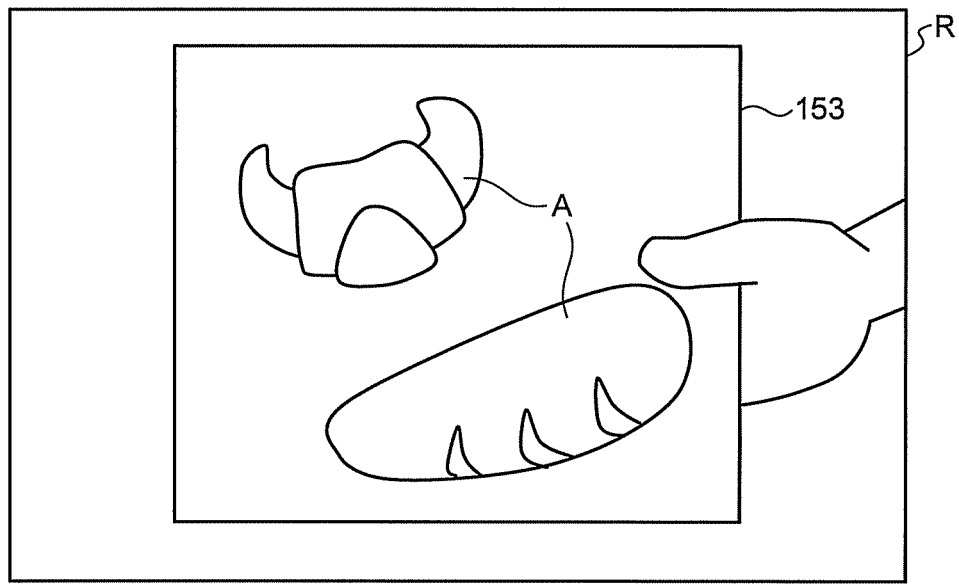
FIG. 6 is a conceptual diagram of an example of a reading area in a reading window.

FIG. 6 is a conceptual diagram of an example of a reading area R in the reading window 103. Specifically, FIG. 6 is a conceptual diagram of the reading area R in reading the commodities A. As shown in FIG. 6, if the commodities A in the paper box 153 is reflected in the reading area R in the moving process of the commodities A, in Act 3, all or a part of all the commodities A in the paper box 153 are detected from a frame image obtained by picking up an image of the reading area R. According to the detection of all or a part of all the commodities A in the paper box 153, in Act 4, the frame image obtained by picking up an image of the reading area R is output to the POS terminal 11.

Subsequently, the CPU 161 determines presence or absence of a job end due to, for example, an end notification of the commodity registration from the POS terminal 11 (Act 5). If the job is continued (No in Act 5), the CPU 161 returns Act 2 and continues the processing. If the job is ended (Yes in Act 5), the picked-up-image capturing section 1611 outputs an image pickup OFF signal to the image pickup section 164, ends the image pickup by the image pickup section 164 (Act 6), and ends the processing.

The operations on the POS terminal 11 side are explained. As shown in FIG. 5, when processing is started according to, for example, the start of commodity registration by an instruction through operation of the keyboard 22, the CPU 61 receives a frame image in which all or a part of all the commodities A in the paper box 153 are detected output from the commodity reading apparatus 101 (Act 11). Subsequently, the object recognizing section 611 recognizes, referring to the commodity images of the PLU file F1, the commodities A in order as specific objects from an image of all or a part of all the commodities A in the paper box 153 output from the commodity reading apparatus 101 (Act 12).

Figure 7:
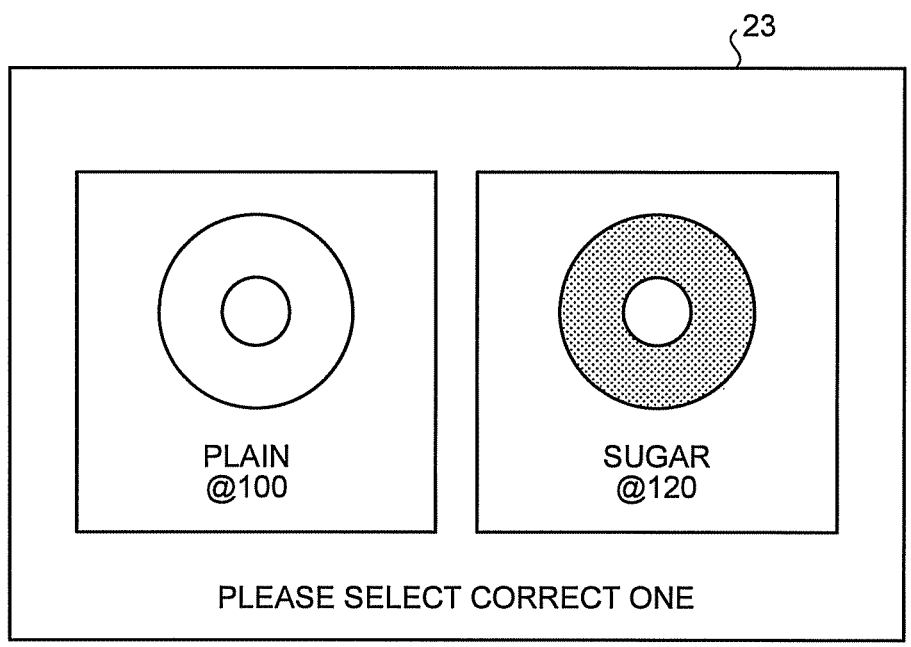
FIG. 7 is a conceptual diagram of a display example by a display device.

As a result of the recognition in Act 12, in some case, plural candidates of the commodity A are present. Therefore, if plural candidates of the commodity A are present (Yes in Act 13), the CPU 61 informs the store clerk to that effect through screen display on the display device 23 shown in FIG. 7 (Act 14). FIG. 7 is a conceptual diagram of a display example by the display device 23. As shown in FIG. 7, commodity names and unit prices of the plural candidates of the commodity A, which are a result of the recognition in Act 12, are acquired from the PLU file F1 and displayed on the display screen of the display device 23. In an example shown in FIG. 7, "plain doughnut" and "sugar doughnut" are displayed.

Thereafter, if the CPU 61 determines that the operator (the store clerk) selects a correct candidate as the commodity A via the touch panel 26 (Yes in Act 15), the processing proceeds to Act 16.

If plural candidates of the commodity A are not present (No in Act 13), the processing directly proceeds to Act 16.

Subsequently, the similarity determining section 613 calculates similarity concerning the commodity A recognized by the object recognizing section 611 (Act 16). If the similarity of the commodity images of the commodities stored in the PLU file F1 is 100%="similarity: 1.0", the similarity indicates to which degree images of all or a part of the commodity output from the commodity reading apparatus 101 are similar. As explained above, the similarity is calculated according to a state of the surface of the commodity A such as a tint and an unevenness state of the surface. For example, weighting may be changed for the tint and for the unevenness state of the surface.

The similarity determining section 613 determines whether the similarity calculated in Act 16 exceeds the threshold ("similarity: 0.XX") set in advance (Act 17).

If the similarity determining section 613 determines that the similarity calculated in Act 16 exceeds the threshold ("similarity: 0.XX") set in advance (Yes in Act 17), in Act 18, the commodity registering section 612 registers a recognition result of the commodities A as specific objects and sales of one commodity A selected out of the recognition result and specified.

The CPU 61 determines whether all the objects are recognized (Act 19). If the CPU 61 determines that all the objects are recognized (Yes in Act 19), the processing proceeds to Act 20. If the CPU 61 recognizes that not all the objects are recognized (No in Act 19), the CPU 61 returns the processing to Act 12 and continues the recognition processing for the next object.

Figure 8:
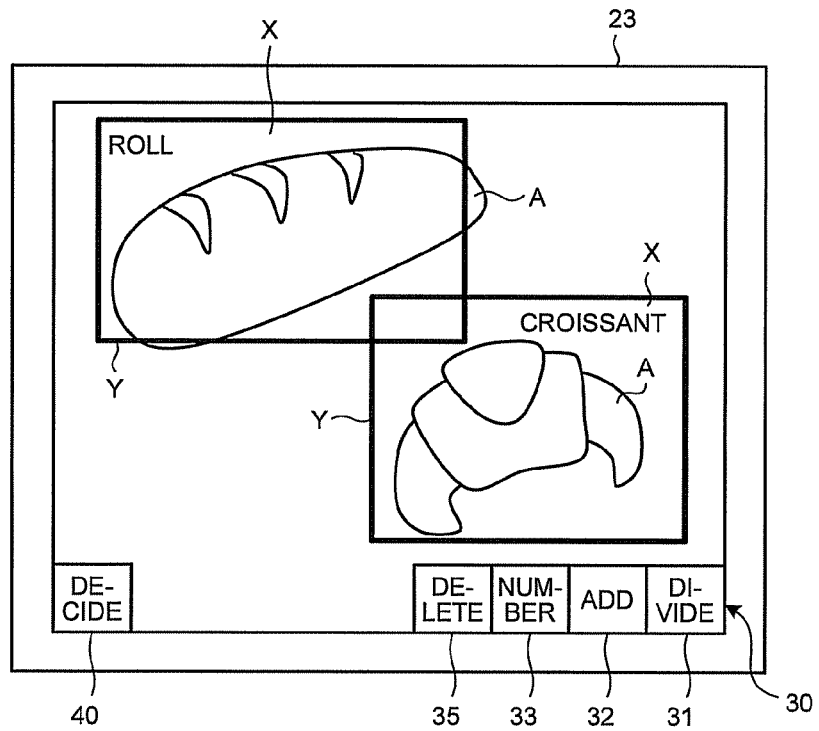
FIG. 8 is a conceptual diagram of a display example by the display device.

In Act 20, the problem solving section 616 performs screen display on the display device 23 shown in FIG. 8 to thereby inform the operator (the store clerk) that the commodity A is recognized. In an example shown in FIG. 8, the problem solving section 616 displays an image of the commodity A in the paper box 153 and displays both of commodity information such as a commodity name of the commodity A stored in advance and a frame line (a first line) Y indicating that the commodity A is recognized.

Figure 9:
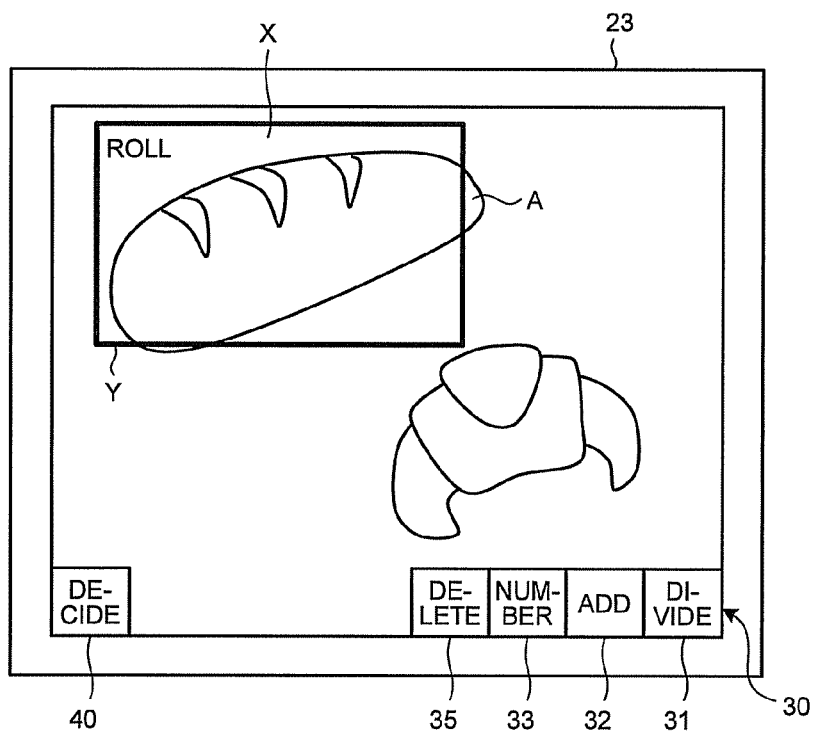
FIG. 9 is a conceptual diagram of a display example by the display device.

However, as shown in FIG. 9, in some case, even if all the objects are recognized, an unrecognized commodity is present because of the influence of a color of the paper box 153 (a color of the tray), a shadow of the operator or the like. In such a case, it is necessary to designate an image area not selected as a candidate and perform the recognition processing again.

Figure 10:
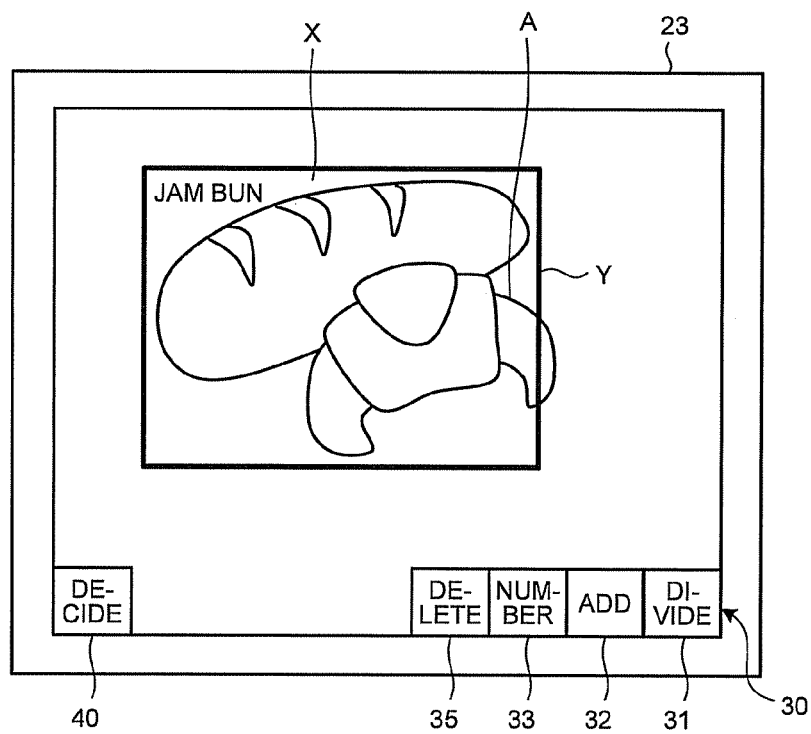
FIG. 10 is a conceptual diagram of a display example by the display device.

As shown in FIG. 10, in some case, objects originally separate from each other are recognized as one object. In such a case, it is necessary to perform the recognition processing again designating an area in which the objects are recognized in combination. In an example shown in FIG. 10, since the objects originally separate from each other are recognized as one object, the objects are recognized as a totally different object (a jam bun).

Figure 11:
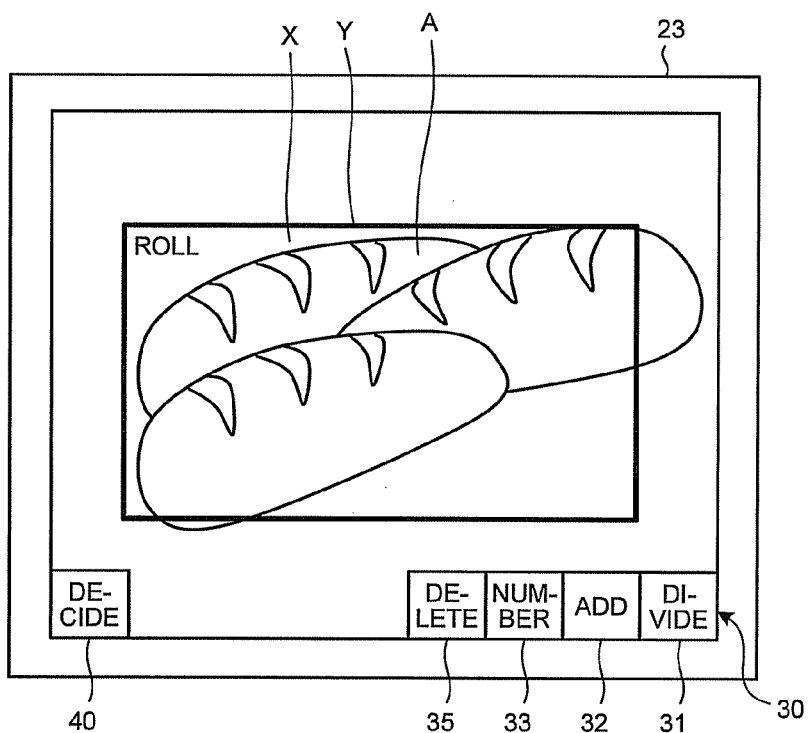
FIG. 11 is a conceptual diagram of a display example by the display device.

Further, in some case, as shown in FIG. 11, since plural same commodities overlap one another, the commodities are recognized as one object. In such a case, it is necessary to input only the number of commodities again.

Therefore, the problem solving section 616 includes an instructing section 30 and a decision key 40 for solving the various problems explained above in screen display on the display device 23. As shown in FIGS. 8 to 12, the instructing section 30 displayed on the display device 23 includes a division instruction key 31, an addition instruction key 32, a number-of-items addition instruction key 33, and a deletion key 35.

If, as shown in FIG. 9, even if all the objects are recognized, an unrecognized commodity is present because of the influence of a color of the paper box 153 (a color of the tray), a shadow of the operator or the like, the operator (the store clerk) presses the addition instruction key 32 via the touch panel 26. If the problem solving section 616 determines that the operator (the store clerk) presses the addition instruction key 32 via the touch panel 26, the problem solving section 616 causes the operator (the store clerk) to designate an image area not selected as a candidate. A method of declaring to additionally carry out recognition when an unrecognized commodity is present is not limited to a method of pressing the addition instruction key 32 displayed on the display device 23 via the touch panel 26 and may be a method of, for example, providing an addition instruction key in the keyboard 22 and pressing the addition instruction key to declare to additionally carry out recognition.

Figure 13:
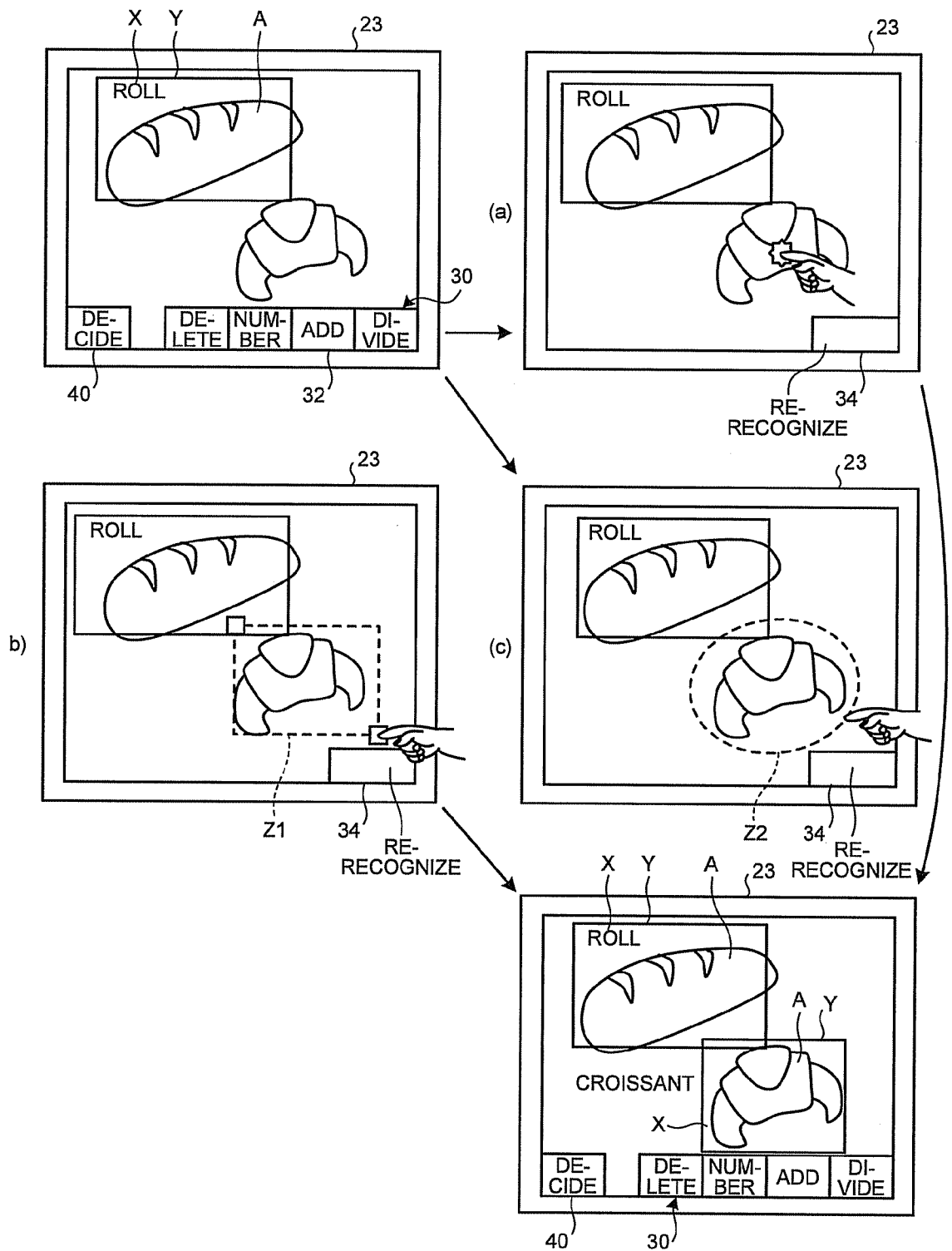
FIG. 13 is a conceptual diagram for explaining a method of designating an image area not selected as a candidate.

A method of causing the operator (the store clerk) to designate an image area not selected as a candidate is explained. FIG. 13 is a conceptual diagram for explaining the method of causing the operator (the store clerk) to designate an image area not selected as a candidate. As shown in FIG. 13, as the method of designating an image area not selected as a candidate via the touch panel 26, there are methods described below.

(a) A method of designating the center of an area (see (a) of FIG. 13)

(b) A method of designating an area with opposite angles of the area (see (b) of FIG. 13)

(c) A method of designating an area by surrounding the area with a circle (a spline) (see (c) of FIG. 13)

As shown in (b) of FIG. 13, in the method of designating an area with opposite angles of the area, the problem solving section 616 causes the operator (the store clerk) to designate an image area not selected as a candidate with a frame line (a second line) Z1 having a form different from the frame line (the first line) Y indicating that a commodity is recognized.

As shown in (c) of FIG. 13, in the method of designating an area by surrounding the area with a circle (a spline), the problem solving section 616 causes the operator (the store clerk) to designate an image area not selected as a candidate with a frame line (a second line) Z2 having a form different from the frame line (the first line) Y indicating that a commodity is recognized.

After causing the operator (the store clerk) to designate an image area not selected as a candidate using any one of the methods, the problem solving section 616 determines that the operator (the store clerk) presses a re-recognition key 34 displayed on the display device 23 shown in FIG. 13 via the touch panel 26. Then, the CPU 61 regards that addition is instructed (Yes in Act 21), returns the processing to Act 12, and causes the POS terminal 11 to execute recognition processing for an object in the image area not selected as a candidate.

Figure 14:
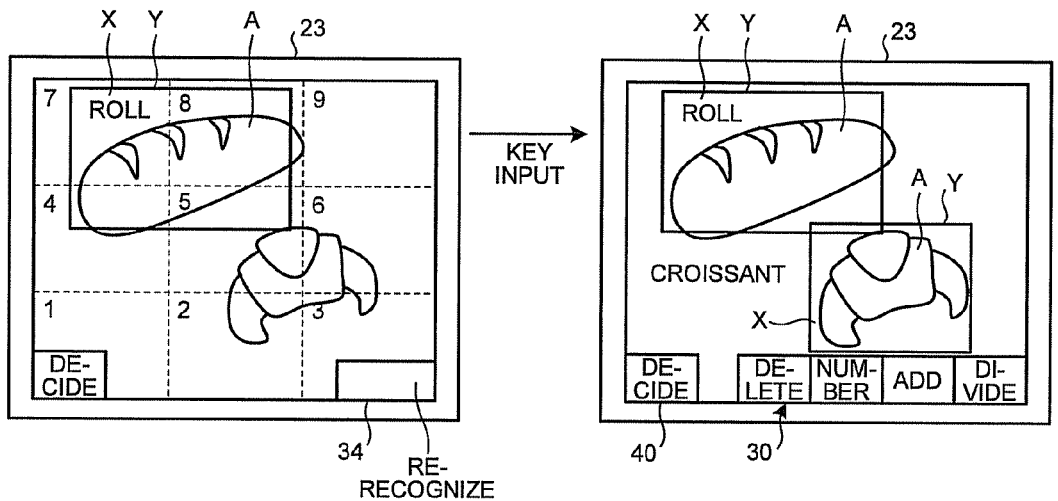
FIG. 14 is a conceptual diagram for explaining a method of designating an image area not selected as a candidate.

The method of causing the operator (the store clerk) to designate an image area not selected as a candidate is not limited to the method of designating an image area not selected as a candidate via the touch panel 26 and may be a method of indicating (up and down and left and right) an image area not selected as a candidate with sound or a method of designating an unanalyzed area with the keyboard 22. For example, as an example of the method of designating an unanalyzed area with the keyboard 22, as shown in FIG. 14, the problem solving section 616 divides a screen displayed on the display device 23 into nine to overlay-display the divided screens and causes the operator (the store clerk) to designate a schematic area with 1 to 9 of the ten key 22d. Keys corresponding to the screen division (sixteen division of 4×4 or twenty-five division of 5×5) including the keys other than the ten key 22d may be overlay-displayed.

If objects originally separate from one another are recognized as one object as shown in FIG. 10, the operator (the store clerk) presses the division instruction key 31 via the touch panel 26. When the problem solving section 616 determines that the operator (the store clerk) presses the division instruction key 31 via the touch panel 26, the problem solving section 616 causes the operator (the store clerk) to divide the image area via the touch panel 26. As a method of causing the operator (the store clerk) to divide the image area, as shown in (a) of FIG. 15, the problem solving section 616 causes the operator (the store clerk) to divide the area with a straight line (a spline) via the touch panel 26.

Figure 15:
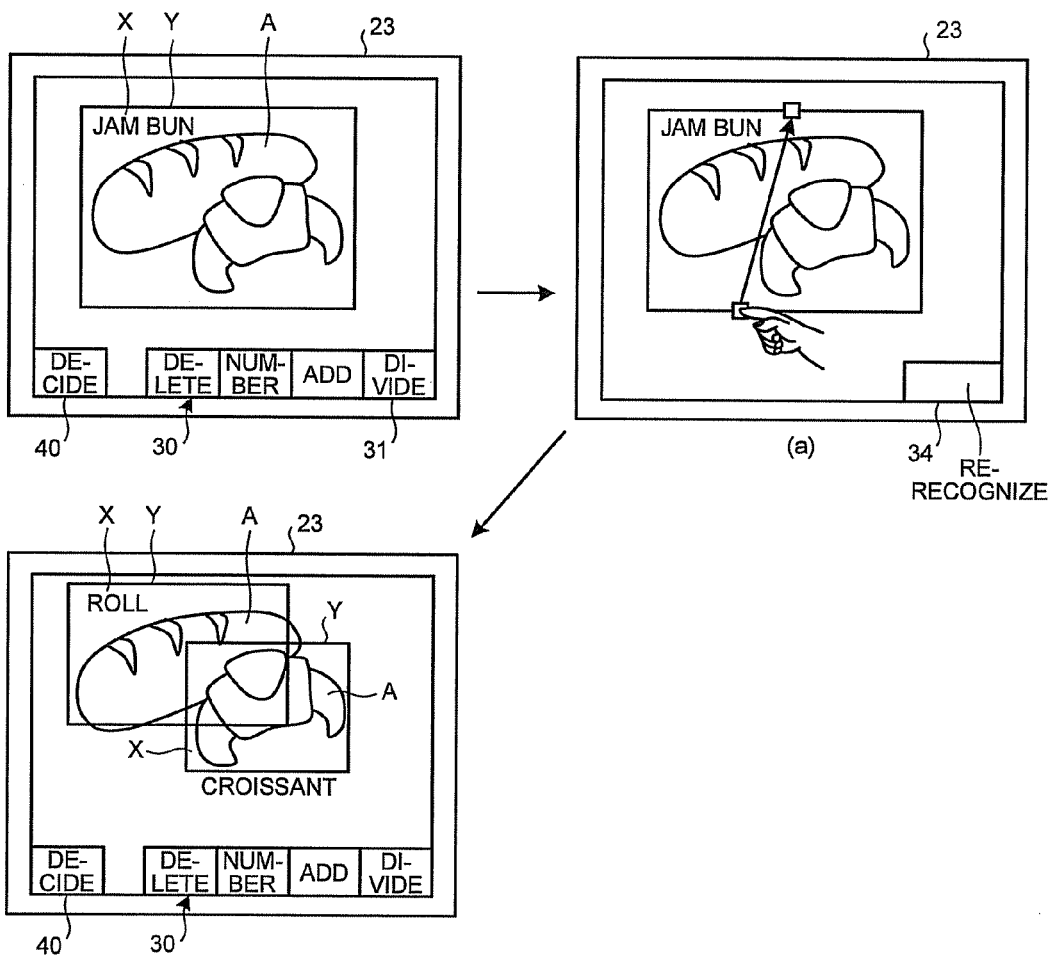
FIG. 15 is a conceptual diagram for explaining a method of dividing an image area.

After causing the operator (the store clerk) to divide the image area, the problem solving section 616 determines that the operator (the store clerk) presses the re-recognition key 34 displayed on the display device 23 shown in FIG. 15 via the touch panel 26. Then, the CPU 61 regards that division is instructed (Yes in Act 21), returns the processing to Act 12, and causes the POS terminal 11 to execute recognition processing for objects in the divided image areas.

If, since plural same commodities overlap one another, the commodities are recognized as one object as shown in FIG. 11, the operator (the store clerk) presses the number-of-items addition instruction key 33 via the touch panel 26. If the problem solving section 616 determines that the operator (the store clerk) presses the number-of-items addition key 33 via the touch panel 26, the problem solving section 616 causes the operator (the store clerk) to input the number of items from the ten key 22d or the like of the keyboard 22.

Figure 12:
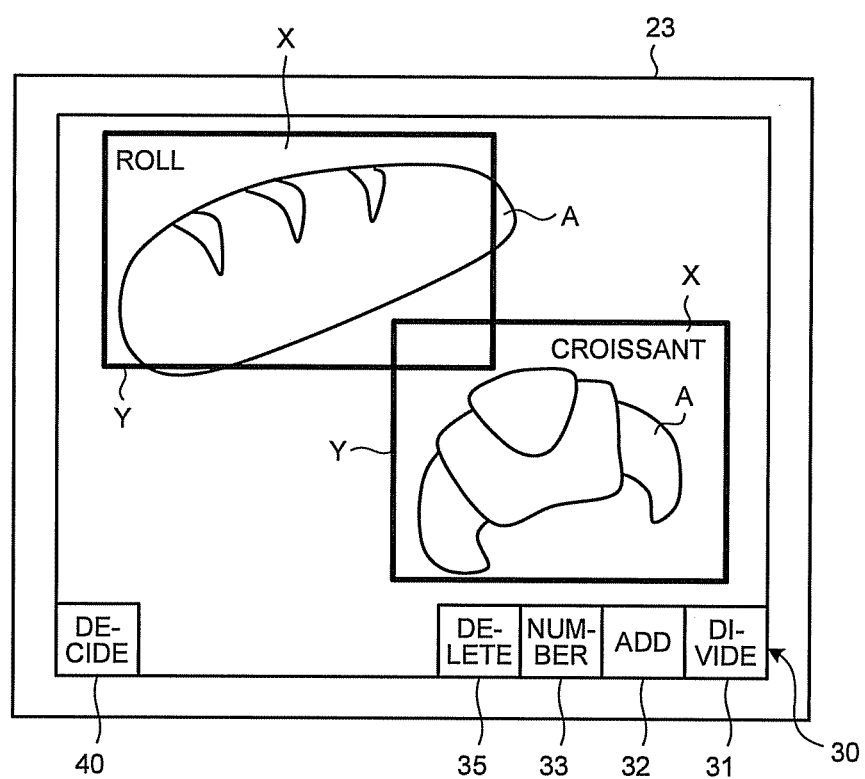
FIG. 12 is a conceptual diagram of a display example by the display device performed when a customer requests return of a commodity after the commodity is recognized.

If, although all objects are recognized, the customer requests return of a commodity after the commodity is recognized as shown in FIG. 12, the operator (the store clerk) presses the deletion key 35 via the touch panel 26. If the problem solving section 616 determines that the operator (the store clerk) presses the deletion key 35 via the touch panel 26, the problem solving section 616 causes the operator (the store clerk) to designate the commodity to be returned (deleted).

Figure 16:
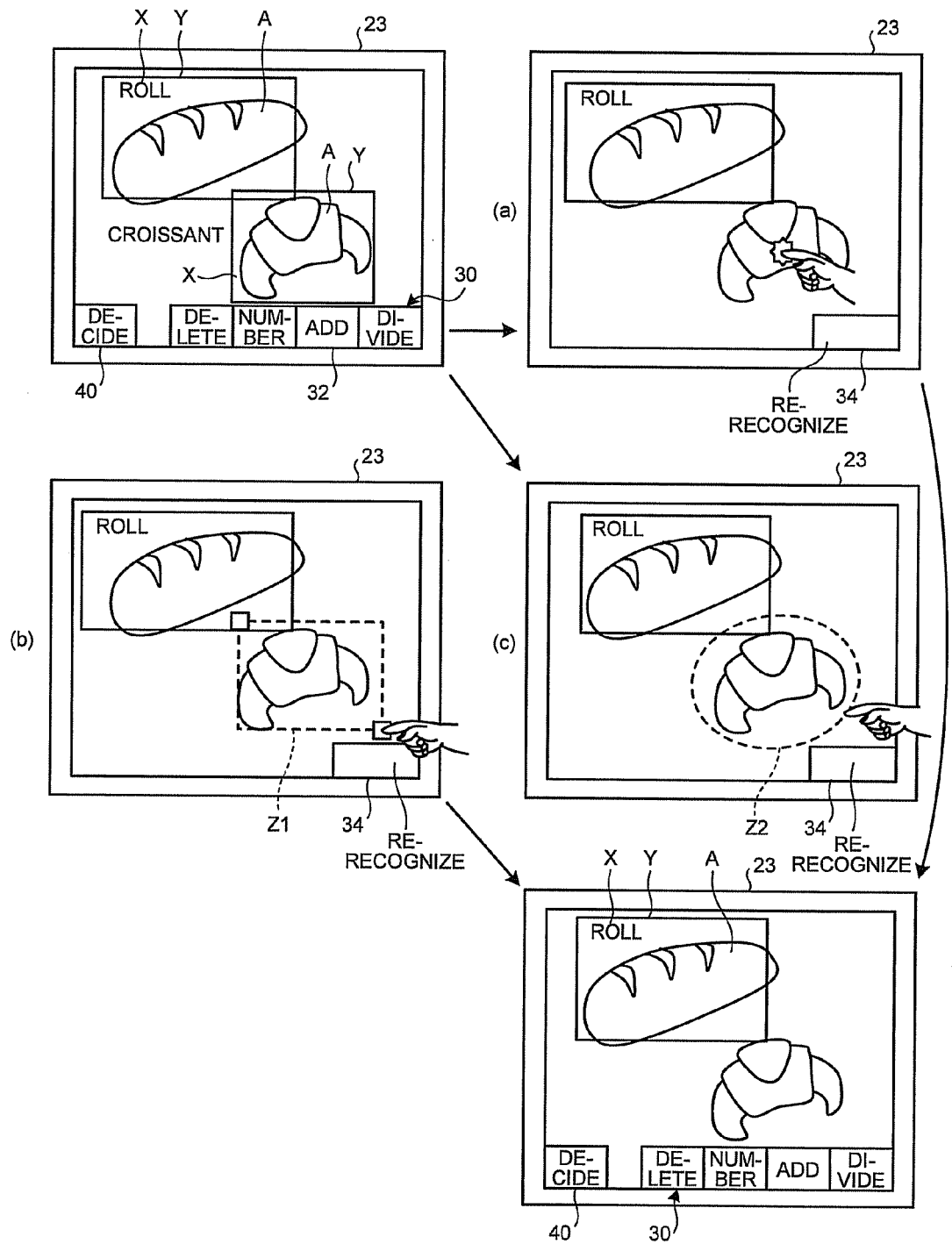
FIG. 16 is a conceptual diagram for explaining a method of designating a commodity to be returned.

As a method of causing the operator (the store clerk) to designate a commodity to be returned (deleted), a method same as the method of causing the operator (the store clerk) to designate an image area not selected as a candidate explained above is conceivable. FIG. 16 is a conceptual diagram for explaining a method of causing the operator (the store clerk) to designate a commodity to be returned (deleted). As shown in FIG. 16, as the method of designating a commodity to be returned (deleted) via the touch panel 26, there are methods described below.

(a) A method of directly designating a commodity to be returned (see (a) of FIG. 16)

(b) A method of designating a commodity to be returned with opposite angles of an area (see (b) of FIG. 16)

(c) A method of surrounding a commodity to be returned with a circle (a spline) and designating the commodity to be returned (see (c) of FIG. 16)

The method of causing the operator (the store clerk) to designate a commodity to be returned (deleted) is not limited to the method of designating a commodity to be returned (deleted) via the touch panel 26 and may be a method of indicating (up and down and left and right) a commodity to be returned (deleted) with sound or a method of designating an unanalyzed area with the keyboard 22. As an example of the method of designating an unanalyzed area with the keyboard 22, as explained with reference to FIG. 14, the problem solving section 616 divides the screen displayed on the display device 23 into nine to overlay-display the divided screens and causes the operator (the store clerk) to designate a schematic area with 1 to 9 of the ten key 22d. Keys corresponding to the screen division (sixteen division of 4×4 or twenty-five division of 5×5) including the keys other than the ten key 22d may be overlay-displayed.

After causing the operator (the store clerk) to designate the commodity to be returned (deleted), the problem solving section 616 determines that the operator (the store clerk) presses the re-recognition key 34 displayed on the display device 23 shown in FIG. 16 via the touch panel 26. Then, the CPU 61 regards that return (deletion) is instructed (Yes in Act 22), returns the processing to Act 18, and causes the commodity registering section 612 to execute sales registration of the commodity A reduced in the number of items.

If the problem solving section 616 determines that the operator (the store clerk) inputs the number of items via the ten key 22d or the like of the keyboard 22 (Yes in Act 23), the CPU 61 returns the processing to Act 18 and causes the commodity registering section 612 to execute sales registration of the commodity A increased or reduced in the number of items.

On the other hand, after the problem solving section 616 performs the screen display on the display device 23 shown in FIG. 8 to thereby inform the operator (the store clerk) that the commodity A is recognized, if the problems shown in FIGS. 9 to 12 do not occur, the operator (the store clerk) presses the decision key 40 via the touch panel 26. If the problem solving section 616 determines that the operator (the store clerk) presses the decision key 40 via the touch panel 26 (Yes in Act 24), the CPU 61 advances the processing to Act 25.

In this way, with the checkout system 1 according to this embodiment, even if a problem occurs in object recognition, it is possible to easily solve the problem.

Figure 17:
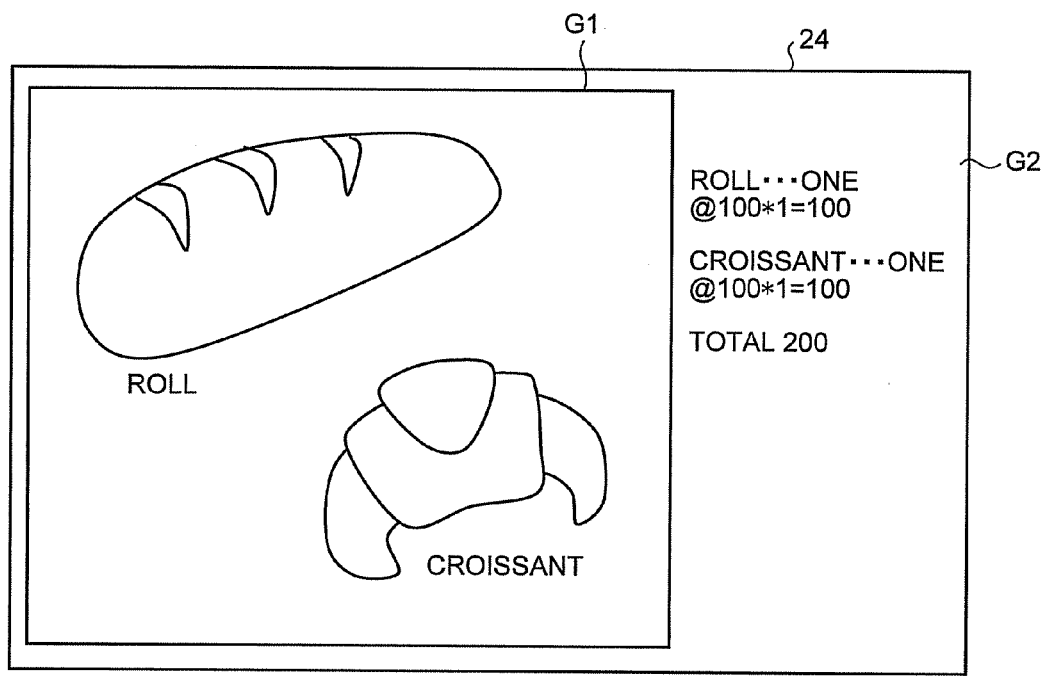
FIG. 17 is a conceptual diagram of a display example by a customer display device.

In Act 25, the check-image display section 615 causes the customer to check purchased commodities through screen display on the customer display device 24 shown in FIG. 17. In an example shown in FIG. 17, an image of the paper box 153 in which the commodities A are packed is displayed in a display area G1. Commodity information such as commodity names and unit prices of the commodities A stored in advance and a history of purchased commodities such as the numbers of items and a total amount are displayed in a display area G2. The commodity names are appended to the commodities A displayed in the display area G1. The CPU 61 of the POS terminal 11 performs the display of the history of the purchased commodities in the display area G2 on the basis of information concerning the purchased commodities stored in the RAM 63. With such screen display, it is possible to cause the customer to check whether the commodities A are the same as commodities desired by the customer. In the past, in a pastry shop, a doughnut shop or the like, a store clerk shows the paper box 153, in which the commodities A are packed, to a customer over the showcase 151, checks with a customer whether the commodities A are correct, and then performs POS operation such as registration and closing operation for a sales transaction. However, in this system, since purchased commodities are displayed on the commodity reading apparatus 101 and information such as commodity names and prices of all the commodities are collectively read out, it is possible to complete the POS operation in a short time after the customer checks the commodities.

The screen display on the customer display device 24 shown in FIG. 17 is different from the read image shown in FIG. 6. The screen display on the customer display device 24 shown in FIG. 17 is a state viewed from the customer side during counter selling. The read image shown in FIG. 6 is a state viewed from the operator (store clerk) side. In other words, the check-image display section 615 reverses the read image up and down and left and right to thereby display the read image as viewed from the customer side. The check-image display section 615 displays, according to the reversed image, a caption such as a commodity name candidate displayed over an image as well in a direction in which the caption can be read.

Subsequently, the CPU 61 determines whether a job is ended according to, for example, the end of the sales registration by the instruction through operation of the keyboard 22 (Act 26). If the job is ended (Yes in Act 26), the CPU 61 ends the screen display on the customer display device 24 and ends the processing.

On the other hand, if the similarity determining section 613 determines that the similarity calculated in Act 16 does not exceed the threshold ("similarity: 0.XX") set in advance (No in Act 17), the defective informing section 614 informs the store clerk that the commodity A is a commodity not recognized as a regular commodity (Act 27) and urges the store side to take measures such as stop of sale or price-cut sale. Specifically, the defective informing section 614 informs the store clerk of an error, for example, through screen display on the display device 23 or on the display device 106 via the connection interfaces 65 and 176 or through the output of warning sound by the sound output section 165 via the connection interfaces 65 and 175. By informing the error in this way, the checkout system 1 can urge the store clerk to perform appropriate operation such as reading of another commodity A.

If the CPU 61 determines that price-cut sale is instructed by, for example, an instruction through operation of the keyboard 22 (Yes in Act 28), in Act 18, the commodity registering section 612 registers a recognition result of the commodities A as specific objects and registers, in a cut-price, sales of one commodity A selected out of the recognition result and specified. If the CPU 61 determines that stop of sale is instructed by, for example, an instruction through operation of the keyboard 22 (No in Act 28), the CPU 61 returns the processing to Act 12.

Figure 18:
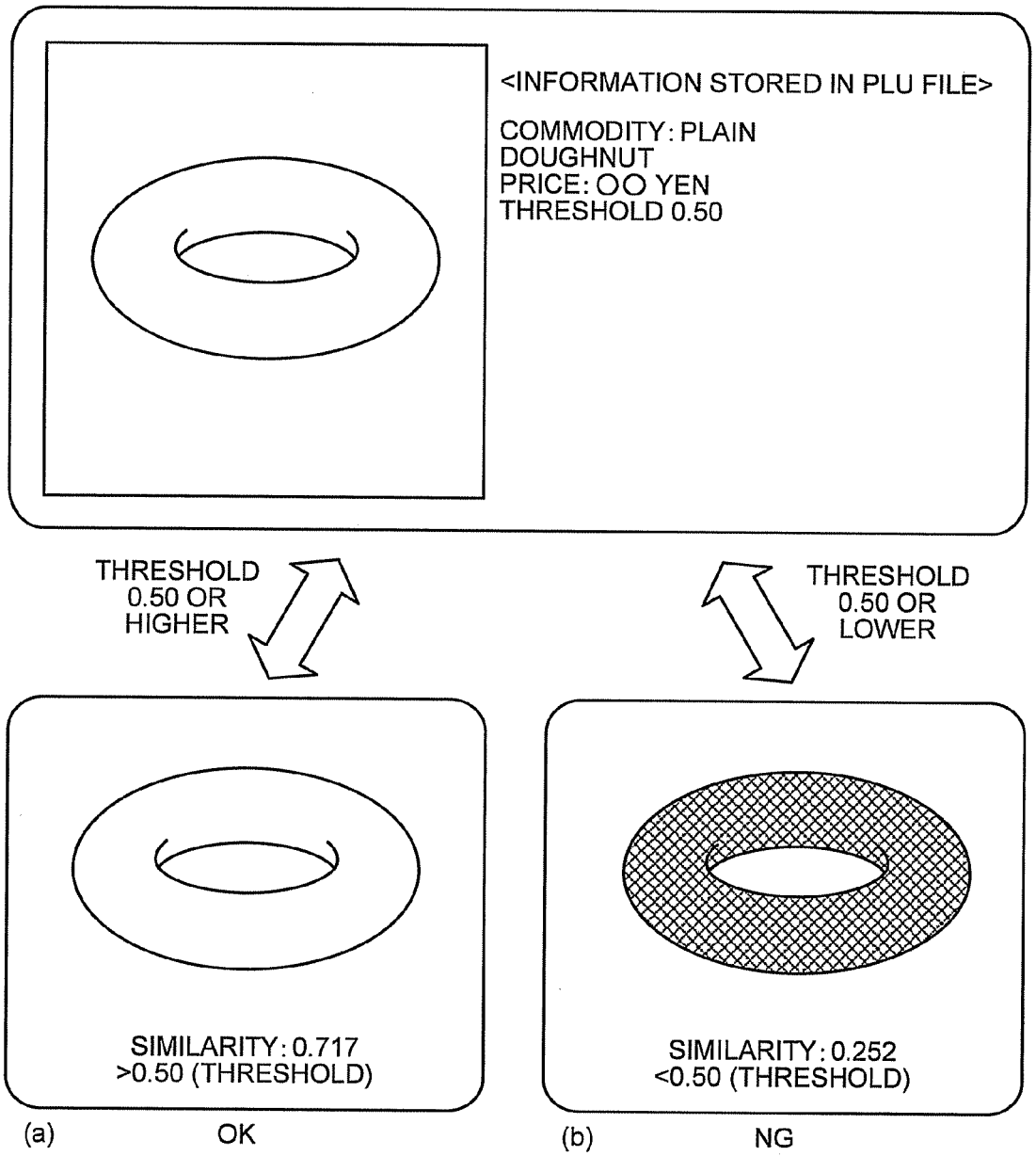
FIG. 18 is a schematic explanatory diagram of a specific example of processing.

As shown in FIG. 18, if the commodity A recognized by the object recognizing section 611 is "plain doughnut", if a threshold is stored in the PLU file FI as "similarity: 0.50", since similarity is 0.717 concerning a commodity indicated by (a), it is determined that the calculated similarity exceeds the threshold set in advance. On the other hand, since similarity is 0.252 concerning a commodity indicated by (b), it is determined that the calculated similarity does not exceed the threshold set in advance. Therefore, the commodity indicated by (a) is subjected to sales registration as "plain doughnut" as usual. On the other hand, the commodity indicated by (b) is tentatively recognized as "plain doughnut". However, the commodity is regarded as a defective commodity aged and discolored, damaged or deformed, i.e., a defective commodity having an abnormal tint, unevenness state of the surface or the like, and is not subjected to sales registration. In particular, concerning a doughnut, a bun or the like, commodity images based on a regular baked state and a regular fried state are stored in the PLU file F1. If insufficient or excess baking or insufficient or excess frying deviates from a threshold, it can be determined that the commodity is a defective.

In this way, with the checkout system 1 according to this embodiment, if a doughnut, a bun or the like is a commodity aged and discolored, damaged, or deformed or a commodity having a different tint because of a cooking failure, it is possible to determine that a commodity deviating from a standard is a defective by comparing the commodity with the commodity images stored in the PLU file F1.

In particular, for example, in a store where there is a limit in time for checking freshness of commodities such as a busy store or a store where a large number of employees are employed and there is an individual difference in cooking of a doughnut or a bun, it is possible to compare a commodity with a regular commodity according to numerical determination.

In this way, with the checkout system 1 according to this embodiment, it is possible to cause the customer to check commodity information such as a name and a unit price of a commodity together with commodity image. Therefore, it is possible to reduce errors. Since it is possible to collectively read commodities on the tray or commodities in the paper box 153 and collectively read out commodity information, it is possible to perform a transaction concerning sale in a short time.

Further, with the checkout system 1 according to this embodiment, in a store where there are a large number of similar commodities and plural candidates of the commodity A are present, it is possible to prevent an error of a commodity by displaying all the candidates of the commodity A and causing the customer to select a candidate.

In this embodiment, an object to be recognized is a sales commodity stored in the PLU file F1. However, the object to be recognized is not limited to this and may be a sales promotion commodity or the like used for sales promotion.

The computer programs executed in the POS terminal 11 and the commodity reading apparatus 101 according to this embodiment are provided while being incorporated in a ROM or the like in advance. The computer programs executed in the POS terminal 11 and the commodity reading apparatus 101 according to this embodiment may be configured to be provided while being recorded in a computer-readable recording medium such as a CD-ROM, a flexible disk (FD), a CD-R or a DVD (Digital Versatile Disk) as a file of an installable format or an executable format.

Further, the computer programs executed in the POS terminal 11 and the commodity reading apparatus 101 according to this embodiment may be configured to be provided while being stored on a computer connected to a network such as the Internet and downloaded through the network. The computer programs executed in the POS terminal 11 and the commodity reading apparatus 101 according to this embodiment may be configured to be provided or distributed through the network such as the Internet.

The computer program executed in the POS terminal 11 according to this embodiment has a module configuration including the sections explained above (the object recognizing section 611, the commodity registering section 612, the similarity determining section 613, the defective informing section 614, the check-screen display section 615 and the problem solving section 616). As actual hardware, a CPU (a processor) reads out the computer program from the ROM and executes the computer program, whereby the sections are loaded onto a main storage and the object recognizing section 611, the commodity registering section 612, the similarity determining section 613, the defective informing section 614, the check-screen display section 615, and the problem solving section 616 are generated on the main storage.

The computer program executed in the commodity reading apparatus 101 according to this embodiment has a module configuration including the sections explained above (the picked-up-image capturing section 1611, the commodity detecting section 1612, and the image output section 1613). As actual hardware, a CPU (a processor) reads out the computer program from the ROM and executes the computer program, whereby the sections are loaded onto a main storage and the picked-up-image capturing section 1611, the commodity detecting section 1612, and the image output section 1613 are generated on the main storage.

In this embodiment, the object recognizing section 611, the commodity registering section 612, the similarity determining section 613, the defective informing section 614, the check-image display section 615 and the problem solving section 616 are provided on the POS terminal 11 side. However, the present invention is not limited to this. The object recognizing section 611, the commodity registering section 612, the similarity determining section 613, the defective informing section 614, the check-image display section 615 and the problem solving section 616 may be provided on the commodity reading apparatus 101 side. In this case, the commodity reading apparatus 101 is the store system.

In this embodiment, the picked-up-image capturing section 1611, the commodity detecting section 1612 and the image output section 1613 are provided on the commodity reading apparatus 101 side. However, the present invention is not limited to this. The picked-up-image capturing section 1611, the commodity detecting section 1612 and the image output section 1613 may be provided on the POS terminal 11 side. In this case, the POS terminal 11 is the store system.

The picked-up-image capturing section 1611, the commodity detecting section 1612 and the image output section 1613 may be provided on the commodity reading apparatus 101 side. The sales registration performed in the POS terminal 11 may be performed on the commodity reading apparatus 101 side.

Further effects and modifications can be easily derived by those skilled in the art. Therefore, a wider form of the present embodiments is not limited to the specific details and the representative embodiment represented and described above. Therefore, various changes are possible without departing from the spirit and the scope of the general concept of the embodiments defined by the appended claims and equivalents of the claims.

What is claimed is:

1. A store system comprising:
    an image output section configured to output an image picked up by an image pickup section;
    an object recognizing section configured to recognize a specific object as a specific commodity registered in advance by reading a feature value of the output image;
    a check-image display section configured to display, on a display section, at least an image concerning the recognized object, wherein when a first object of a plurality of objects included in the output image is recognized as a first specific commodity by the object recognizing section, the display section displays an image of the first object, first information indicating the first object is recognized, and commodity information of the first specific commodity, and when a second object of the plurality of objects included in the output image is not recognized as a specific commodity by the object recognizing section, the display section displays an image of the second object without displaying second information indicating the second object is recognized; and
    a problem solving section configured to receive, through the display section, when the display section displays the image of the second object without displaying the second information indicating the second object is recognized, an instruction indicating a position of the second object on the display section of the image of the second object displayed on the display section and cause the object recognizing section to recognize, based on the feature value of the image of the second object, the second object of the position on the display section indicated by the receiving instruction again.

2. A store system comprising:
    an image pickup section;
    a display section;
    an image output section configured to output an image picked up by the image pickup section;
    an object recognizing section configured to recognize a specific object as a specific commodity registered in advance by reading a feature value of the output image;
    a check-image display section configured to display, on the display section, at least an image concerning the recognized object, wherein when a first object of a plurality of objects included in the output image is recognized as a first specific commodity by the object recognizing section, the display section displays an image of the first object, first information indicating the first object is recognized, and commodity information of the first specific commodity, and when a second object of the plurality of objects included in the output image is not recognized as a specific commodity by the object recognizing section, the display section displays an image of the second object without displaying second information indicating the second object is recognized; and a problem solving section configured to receive, through the display section, when the display section displays the image of the second object without displaying the second information indicating the second object is recognized, an instruction indicating a position of the second object on the display section of the image of the second object displayed on the display section and cause the object recognizing section to recognize, based on the feature value of the image of the second object, the second object of the position on the display section indicated by the receiving instruction again.

3. The store system according to claim 1, wherein, in response to an unrecognized object being present, the problem solving section receives an instruction for designating an area where the unrecognized object is present and causes the object recognizing section to execute object recognition concerning the area.

4. The store system according to claim 1, wherein, in response to objects originally separated from each other being recognized as one object, the problem solving section receives an instruction for dividing an area where objects originally separate from each other are recognized as one object and causes the object recognizing section to execute object recognition concerning divided areas.

5. The store system according to claim 1, wherein, in response to plural same objects being recognized as one object because the objects overlap one another, the problem solving section receives a number of the overlapping objects.

6. The store system according to claim 1, further comprising an input section configured to receive an input from a user, wherein the problem solving section receives, in response to there being a problem in recognition of the object, an instruction indicating the problem via the input section and solves the problem according to content of an instruction received via the input section concerning the image displayed on the display section.

7. The store system according to claim 6, wherein the input section is a touch panel laminated on the display section, and the problem solving section receives, in response to there being a problem in recognition of the object, an instruction indicating the problem via the touch panel and solves the problem according to content of an instruction via the touch panel concerning the image displayed on the display section.

8. The store system according to claim 6, wherein the input section is a keyboard including various keys, and the problem solving section receives, in response to there being a problem in recognition of the object, an instruction indicating the problem via operation of the keys of the keyboard corresponding to various kinds of processing for solving the problem and solves the problem according to content of an instruction corresponding to key operation of the keyboard concerning the image displayed on the display section.

9. The store system according to claim 6, wherein, in response to the instruction concerning the image displayed on the display section being area designation, the problem solving section receives the instruction concerning the image displayed on the display section according to anyone of designation of a center of the area, designation with opposite angles of the area, and designation by surrounding of the area with a spline.

10. The store system according to claim 1, wherein the problem solving section displays the recognized object with a first line attached to the object and, in response to there being a problem in recognition of the object, as processing for solving the problem, displays, in a form different from the first line, a second line for instructing area designation concerning the image displayed on the display section.

11. A sales registration method comprising:

recognizing a specific object as a specific commodity registered in advance by reading a feature value of an output image picked up by an image pickup section;

displaying, on a display section, at least an image concerning the recognized object wherein when a first object of a plurality of objects included in the output image is recognized as a first specific commodity, displaying an image of the first object, first information indicating the first object is recognized, and commodity information of the first specific commodity, and when a second object of the plurality of objects included in the output image is not recognized as a specific commodity by the object recognizing section, displaying an image of the second object without displaying second information indicating the second object is recognized; and receiving, through the display section, when displaying the image of the second object without displaying the second information indicating the second object is recognized, an instruction indicating a position of the second object on the display section of the image of the second object displayed on the display section and recognizing, based on the feature value of the image of the second object, the second object of the position on the display section indicated by the receiving instruction again.

* * * * *